(12) United States Patent
Numata

(10) Patent No.: US 8,482,655 B2
(45) Date of Patent: *Jul. 9, 2013

(54) METHOD OF CONTROLLING IMAGING APPARATUS

(75) Inventor: Hajime Numata, Tokyo (JP)

(73) Assignee: Sony Corporation, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 13/235,072

(22) Filed: Sep. 16, 2011

(65) Prior Publication Data

US 2012/0007989 A1    Jan. 12, 2012

Related U.S. Application Data

(63) Continuation of application No. 11/713,429, filed on Mar. 2, 2007, now Pat. No. 8,023,034.

(30) Foreign Application Priority Data

Mar. 8, 2006 (JP) ................................ 2006-062830

(51) Int. Cl.
  *H04N 5/225* (2006.01)
  *H04N 5/235* (2006.01)
(52) U.S. Cl.
  USPC ......................................... 348/342; 348/362
(58) Field of Classification Search
  USPC ..................... 348/277–280, 342, 362, 221.1
  See application file for complete search history.

(56) References Cited

U.S. PATENT DOCUMENTS

| 5,051,768 | A | 9/1991 | Harrison |
| 5,732,293 | A | 3/1998 | Nonaka et al. |
| 6,424,805 | B2 | 7/2002 | Ohsawa |
| 6,642,955 | B1 | 11/2003 | Midgley et al. |
| 6,759,646 | B1 | 7/2004 | Acharya et al. |
| 2003/0142221 | A1 | 7/2003 | Takakuwa |
| 2008/0029708 | A1 | 2/2008 | Olsen et al. |

FOREIGN PATENT DOCUMENTS

| JP | 11-289491 | 10/1999 |
| JP | 2001-069519 | 3/2001 |
| JP | 2001-356385 | 12/2001 |
| JP | 2002-135788 | 5/2002 |
| JP | 2005-006066 | 1/2005 |

*Primary Examiner* — Hung Lam
(74) *Attorney, Agent, or Firm* — Robert J. Depke; The Chicago Technology Law Group, LLC

(57) ABSTRACT

An imaging apparatus is disclosed. The apparatus includes: a solid-state imaging device provided with a plurality of arranged light-sensitive devices each having sensitivity to light in a range from a visible region to an infrared region; a first filter for transmitting light in the visible region to a first part light-sensitive device out of the plurality of light-sensitive devices; a second filter for transmitting light in the infrared region to a second part light-sensitive device out of the plurality of light-sensitive devices; and a signal processing section for changing a ratio between an electrical signal converted by the first part light-sensitive device and an electrical signal converted by the second part light-sensitive device used as an electrical signal used for deciding exposure in accordance with intensity of the electrical signal converted by the first part light-sensitive device.

4 Claims, 7 Drawing Sheets

METHOD OF CONTROLLING IMAGING APPARATUS

CROSS REFERENCES TO RELATED APPLICATIONS

The subject matter of application Ser. No. 11/713,429 is incorporated herein by reference. The present application is a Continuation of U.S. Ser. No. 11/713,429, filed Mar. 2, 2007, now U.S. Pat. No. 7,423,570, issued Sep. 20, 2011, which claims priority to Japanese Patent Application JP 2006-062830 filed in the Japanese Patent Office on Mar. 8, 2006, the entire contents of which being incorporated herein by reference.

BACKGROUND OF THE INVENTION

1. Field of the Invention

The present invention relates to an imaging apparatus having a solid-state imaging device such as a charge coupled device (CCD) and a method of controlling an imaging apparatus.

2. Related Art

In general, imaging apparatuses such as digital video cameras are equipped with solid-state imaging devices such as CCD or complementary metal-oxide semiconductor (CMOS) as imaging devices. Such solid-state imaging devices convert imaging light from the subjects into analog electrical signals by each of the pixels. Further, the imaging apparatuses convert the analog electrical signals into digital signals, and store the data of the converted digital signals in storage devices or display the data of the converted digital signals on display devices as images.

FIG. 7 shows an example of a part of the configuration of an imaging apparatus 11. The imaging apparatus 11 shown in FIG. 7 is provided with an optical system 21 composed of lenses and the like, a solid-state imaging device 31, an analog signal processing section 51, an A/D converter 61, an image processing section 71, and a controller 81. It should be noted that the analog signal processing section 51, the A/D converter 61, the image processing section 71, and the controller 81 form a signal processing section 41.

The optical system 21 focuses the incident light from the subject into an image on the solid-state imaging device 31. The analog signal processing section 51 retrieves image data from the analog electrical signal converted by the solid-state imaging device 31. Further, the A/D converter 61 connected to the analog signal processing section 51 converts the analog electrical signal into digital image data.

The image processing section 71 connected to the A/D converter 61 performs various image processes such as grayscale conversion, white balance correction, and γ-correction process, and an image process such as YC (luminance-chrominance) conversion process on the digital image data. As described above, the controller 81 performs control of the analog signal processing section 51, the A/D converter 61, and the image processing section 71 forming the signal processing section 41.

The digital image data thus processed with the image processes can separately be stored in a storage device not shown or displayed on a monitor as a display device.

Incidentally, the solid-state imaging device 31 of the imaging apparatus 11 shown in FIG. 7 is composed of CCD. In the CCD, a color filter is provided to each of the pixels so as to achieve imaging of color images. Further, in order for improvement of color reproducibility and enhancement of sensitivity, each of the pixels is provided with an infrared filter for transmitting an infrared component.

Therefore, as shown in FIG. 2B, a filter 3a is provided on the front surface of the solid-state imaging device 31 (3) connected to the signal processing section 41. As shown in FIG. 2A, the filter 3a is composed of totally four kinds of filters including three kinds of color filters R, B, and G for respectively transmitting red light, blue light, and green light in the visible region, and an infrared filter IR for transmitting light in the infrared region.

As shown in FIG. 2A, the filters R, B, G, and IR are arranged in a mosaic manner in the filter 3a to form a single filter with four kinds of filters. This single filter is provided for each of the pixels. In other words, four light-sensitive devices for respectively receiving the four kinds of wavelengths of light beams, namely red, blue, green, and infrared, form a unit of a single pixel . Further, the four light-sensitive devices are provided with respective one of the color filters R, B, and G, and the infrared filter IR.

As related art documents, for example, JP-A-2001-69519, JP-A-2005-6066, and JP-A-11-289491 can be cited.

SUMMARY OF THE INVENTION

Even in the case in which the light-sensitive device forming the CCD is capable of receiving light beams with wavelengths in a range from the visible region to the infrared region, a photoelectric converting section and a charge storing/transmitting section of the CCD often have the same configurations for every light-sensitive device. On the other hand, the light sensitivity of the light-sensitive device forming the CCD varies greatly in accordance with wavelengths of the light beams to be received, and is generally higher for the light beam in the infrared region than for the light beam in the visible region.

Therefore, the charge of the light-sensitive device provided for the infrared filter IR is more easily saturated than the charge of the light-sensitive device provided for either one of the color filters R, B, and G. Further, the light-sensitive device forming the CCD has a wide dynamic range to the light beams in the infrared region, and there is a large difference in the intensity of the electrical signal output from the light-sensitive device between the subject with high reflectivity and the subject with low reflectivity.

Generally, when performing the exposure control in the signal processing section 41 of the imaging apparatus 11 as shown in FIG. 7, the electrical signal of the light-sensitive device provided with the filter for transmitting the light beams in the visible region is used for deciding the exposure.

However, in the case in which only the electrical signal of the light-sensitive device provided with the filter for transmitting the light beams in the visible region is used for the decision of the exposure, there are some cases in which the decision of the exposure cannot be performed appropriately because the intensity of the electrical signal from the light-sensitive device provided with the filter for transmitting the light beams in the infrared region is easily saturated.

For example, the case of shooting the subject 9 including "a tree" as a plant and "a pond" filled with water as shown in FIG. 8A by the imaging apparatus 11 shown in FIG. 7 is considered. In this case, the solid-state imaging device 31 of the imaging apparatus 11 receives the incident light from the subject 9. Then, the electrical signals converted by the light-sensitive devices provided with the R, B, and G filters are used for deciding the exposure.

In the decision of the exposure, the case in which the intensities of the R, B, and G signals are too high is judged to cause a whitish shot image. Further, the case in which the intensities of the R, B, and G signals are too low is judged to cause a blackish shot image. In the case in which it is judged that a whitish shot image is caused, the signal processing section 41 adjusts the R, B, and G signals to have lower intensities while the signal processing section 41 adjust the R, B, and G signals to have higher intensities in the case in which it is judged that a blackish shot image is caused.

FIG. 9 shows the distribution of light reflection intensity of water, soil, and plants in wavelength. As shown in FIG. 9, in the light in the infrared region, the reflection intensity of water is extremely low, and the refection intensity of plants is very high. Therefore, in the case in which the solid-state imaging device 31 receives the incident light from the subject 9 as shown in FIG. 8A, the intensity of the electrical signal converted by the light-sensitive device with the IR filter becomes too low in the "pond" portion of the subject 9 and too high in the "tree" portion of the subject. Further, since the light-sensitive devices have very strong sensitivity to the light in the infrared region, such a difference in the intensities of the electrical signals becomes remarkable.

Therefore, even in the case in which the color tone of the subject 9 as a whole is in a appropriate range and it is judged that no whitish or blackish shot image will be caused in the decision of the exposure based on the electrical signals converted by the light-sensitive devices provided with the R, B, and G filters, the actual shot image might be whitish or blackish.

Specifically, in the case of shooting the subject 9 shown in FIG. 8A by the imaging apparatus 11, if the shooting is performed based on the decision of the exposure made as described above in the "tree" portion of the subject 9, the shot image with the black out "pond" portion as shown in FIG. 8B is produced because the intensity of the electrical signal converted by the light-sensitive device provided with the IR filter in the "pond" portion of the subject 9 is too low.

Further, if the shooting is performed based on the above decision of the exposure made in the "pond" portion of the subject 9, the shot image with the white out "tree" portion as shown in FIG. 8C is produced because the intensity of the electrical signal converted by the light-sensitive device provided with the IR filter in the "tree" portion of the subject 9 is too high.

Therefore, it is desirable to provide an imaging apparatus equipped with a solid-state imaging device provided with light-sensitive devices having sensitivity down to the infrared region arranged thereon and a method of controlling an imaging apparatus both capable of appropriately deciding the exposure of the subject.

According to an embodiment of the invention, there is provided an imaging apparatus including a solid-state imaging device provided with a plurality of arranged light-sensitive devices each having sensitivity to light in a range from a visible region to an infrared region, a first filter for transmitting light in the visible region to a first part light-sensitive device out of the plurality of light-sensitive devices, a second filter for transmitting light in the infrared region to a second part light-sensitive device out of the plurality of light-sensitive devices, and a signal processing section for changing a ratio between an electrical signal converted by the first part light-sensitive device and an electrical signal converted by the second part light-sensitive device used as an electrical signal used for deciding exposure in accordance with intensity of the electrical signal converted by the first part light-sensitive device.

According to another embodiment of the invention, in the imaging apparatus described above, only the electrical signal converted by the second part light-sensitive device is preferably used for deciding the exposure if the intensity of the electrical signal converted by the first part light-sensitive device is lower than predetermined intensity, and only the electrical signal converted by the first part light-sensitive device is preferably used for deciding the exposure if the intensity of the electrical signal converted by the first part light-sensitive device is higher than predetermined intensity.

Further, according to another embodiment of the invention, there is provided an imaging apparatus including a solid-state imaging device provided with a plurality of arranged light-sensitive devices each having sensitivity to light in a range from a visible region to an infrared region, a first filter for transmitting light in the visible region to a first part light-sensitive device out of the plurality of light-sensitive devices, a second filter for transmitting light in the infrared region to a second part light-sensitive device out of the plurality of light-sensitive devices, and a signal processing section for using an electrical signal converted by the light-sensitive device only in a predetermined area out of the plurality of arranged light-sensitive devices for deciding exposure.

According to another embodiment of the invention, in the imaging apparatus described above, an electrical signal converted by the light-sensitive device in an area other than the predetermined area is preferably an electrical signal converted by the second part light-sensitive device, and the intensity of the electrical signal is preferably one of higher and lower than a predetermined value.

Further, according to still another embodiment of the invention, there is provided a method of controlling an imaging apparatus including the steps of providing a solid-state imaging device provided with a plurality of arranged light-sensitive devices each having sensitivity to light in a range from a visible region to an infrared region, a first filter for transmitting light in the visible region to a first part light-sensitive device out of the plurality of light-sensitive devices, and a second filter for transmitting light in the infrared region to a second part light-sensitive device out of the plurality of light-sensitive devices, and changing a ratio between an electrical signal converted by the first part light-sensitive device and an electrical signal converted by the second part light-sensitive device used as an electrical signal used for deciding exposure in accordance with intensity of the electrical signal converted by the first part light-sensitive device.

According to another embodiment of the invention, in the method of controlling an imaging apparatus described above, the changing step preferably includes the steps of using only the electrical signal converted by the second part light-sensitive device for deciding the exposure if the intensity of the electrical signal converted by the first part light-sensitive device is lower than predetermined intensity, and using only the electrical signal converted by the first part light-sensitive device for deciding the exposure if the intensity of the electrical signal converted by the first part light-sensitive device is higher than predetermined intensity.

Further, according to still another embodiment of the invention, there is provided a method of controlling an imaging apparatus including the steps of providing a solid-state imaging device provided with a plurality of arranged light-sensitive devices each having sensitivity to light in a range from a visible region to an infrared region, a first filter for transmitting light in the visible region to a first part light-sensitive device out of the plurality of light-sensitive devices, and a second filter for transmitting light in the infrared region to a second part light-sensitive device out of the plurality of light-sensitive devices, and using an electrical signal converted by the light-sensitive device only in a predetermined area out of the plurality of arranged light-sensitive devices for deciding exposure.

According to another embodiment of the invention, in the method of controlling an imaging apparatus described above, an electrical signal converted by the light-sensitive device in an area other than the predetermined area is preferably an electrical signal converted by the second part light-sensitive device, and the intensity of the electrical signal is preferably one of higher and lower than a predetermined value.

According to the imaging apparatus and the method of controlling an imaging apparatus of the above embodiments of the invention, the decision of the exposure of the subject can accurately be performed. Further, according to the imaging apparatus and the method of controlling an imaging apparatus of the above embodiments of the invention, a black out portion and a white out portion in the shot image can be prevented from occurring.

BRIEF DESCRIPTION OF THE DRAWINGS

FIGS. 2A and 2B are diagrams showing a solid-state imaging device of the imaging apparatus of the embodiment of the invention, wherein FIG. 2A is a plan view of a color filter arranged on an acceptance surface of the solid-state imaging device, and FIG. 2B is a side view of the solid-state imaging device provided with the color filter and connected to a signal processing section.

DESCRIPTION OF THE PREFERRED EMBODIMENTS

Figure 1:
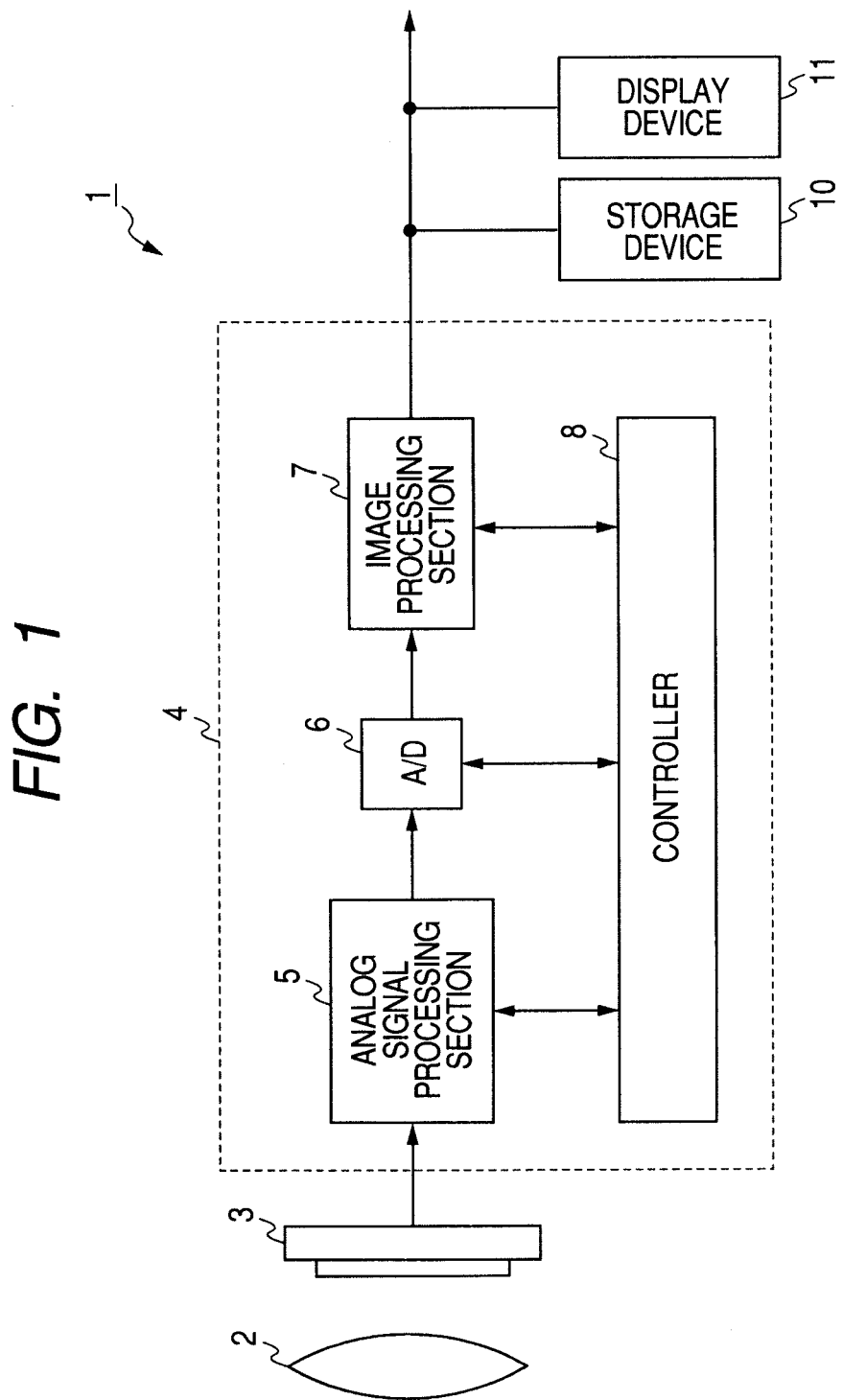
FIG. 1 is a diagram showing the configuration of an imaging apparatus according to an embodiment of the invention.

FIG. 1 is a diagram showing an example of the configuration of an imaging apparatus 1 according to an embodiment of the invention.

The imaging apparatus 1 is provided with an optical system 2 composed of lenses and the like, a solid-state imaging device 3, an analog signal processing section 5, an A/D converter 6, an image processing section 7, and a controller 8. It should be noted that the analog signal processing section 5, the A/D converter 6, the image processing section 7, and the controller 8 form a signal processing section 4.

The optical system 2 focuses the incident light from the subject into an image on the solid-state imaging device 3. The analog signal processing section 5 produces image data from the analog electrical signal converted by the solid-state imaging device 3. Further, the A/D converter 6 connected to the analog signal processing section 5 converts the analog electrical signal into digital image data.

The image processing section 7 connected to the A/D converter 6 performs various image processes such as gray-scale conversion, white balance correction, and γ-correction process, and an image process such as YC conversion process on the digital image data. As described above, the controller 8 performs control of the analog signal processing section 5, the A/D converter 6, and the image processing section 7 forming the signal processing section 4.

The digital image data processed with the image processes can be stored in a storage device 10 or displayed on a monitor as a display device 11.

In this case, the solid-state imaging device 3 is composed of a plurality of light-sensitive devices each having sensitivity in a range from the visible region down to the infrared region. Further, the solid-state imaging device 3 is provided with a color filter 3a on an acceptance surface thereof as shown in FIG. 2B. Further, the signal processing section 4 is connected to the solid-state imaging device 3.

Figure 2A:
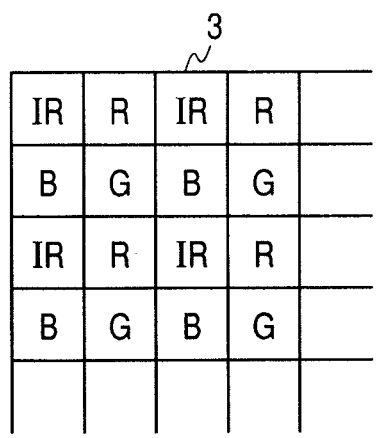
Figure 2B:
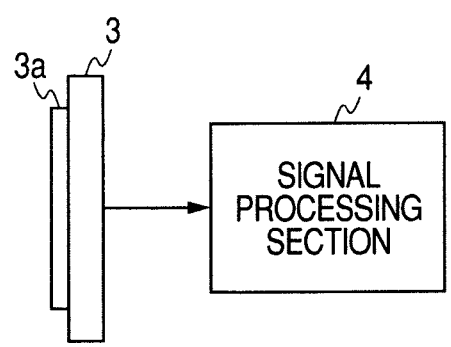

As shown in FIG. 2A, the filter 3a is formed of a matrix of instant units each composed of totally four kinds of filters including three kinds of filters R, G, and B for transmitting the light in the visible region and an IR filter for transmitting the light in the infrared region.

The filter 3a thus arranged in a matrix is provided to the acceptance surface of the solid-state imaging device 3. The solid-state imaging device 3 has a plurality of light-sensitive devices arranged in a matrix so as to correspond to the positions of the filter 3a. Some of the light-sensitive devices thus arranged are provided with the R, G, and B filters for transmitting the light in the visible region, and the other light-sensitive devices are provided with the IR filters for transmitting the light in the infrared region.

Figure 3:
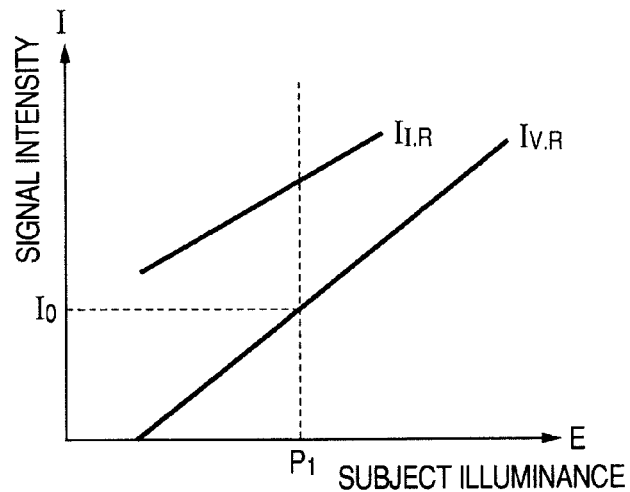
FIG. 3 is a chart showing a relationship between the illuminance E of the light transmitted through a visible light filter or an infrared light filter and accordingly including only a predetermined wavelength component and the intensity I of the electrical signal output by the light-sensitive device receiving the light having that illuminance.

The case in which the light-sensitive devices of the solid-state imaging device 3 having the above configuration receive the light from the subject is considered. FIG. 3 is a chart showing a relationship between the illuminance E of the light transmitted through the R, G, and B filters or the IR filter and accordingly containing only a predetermined wavelength component and the intensity I of the electrical signal output by the light-sensitive device receiving the light having that illuminance.

Since the light-sensitive devices having sensitivity in a range down to the infrared region have higher sensitivity to the light in the infrared region than to the light in the visible region, in the case in which the illuminance E of the light transmitted through the filter and having only a predetermined wavelength component is the same, the signal intensity $I_{IR}$ corresponding to the infrared light component is always higher than the signal intensity $I_{VR}$ corresponding to the visible light component as shown in FIG. 3.

In the embodiment of the invention here, the intensity $I_{VR}$ of the electrical signals converted by the light-sensitive devices accepting the light transmitted through the R, G, and B filters in a pixel at a predetermined position is measured. Then, when deciding the exposure in the pixel, the ratio of use between the electrical signals converted by the light-sensitive devices accepting the light transmitted through the R, G, and B filters and the electrical signal converted by the light-sensitive device accepting the light transmitted through the IR filter is varied in accordance with the intensity $I_{VR}$ of the electrical signals.

For example, if the intensity $I_{V.R}$ is high, the ratio of the electrical signals converted by the light-sensitive devices accepting the light transmitted through the R, G, and B filters in the use for deciding the exposure in the image processing section 7 is set higher than the ratio of the electrical signal converted by the light-sensitive device accepting the light transmitted through the IR filter. Or on the contrary, if the intensity $I_{V.R}$ is low, the ratio of the electrical signals converted by the light-sensitive devices accepting the light transmitted through the R, G, and B filters in the use for deciding the exposure is set lower than the ratio of the electrical signal converted by the light-sensitive device accepting the light transmitted through the IR filter.

In other words, the intensity $I_{I.R}$ of the infrared light component is always higher than the intensity $I_{V.R}$ of the visible light component in the signal intensity I as shown in FIG. 3. Therefore, in the case in which only the electrical signals converted by the light-sensitive devices accepting the light transmitted through the R, G, and B filters are used for deciding the exposure, if the intensity $I_{V.R}$ is too low, sufficient sensitivity cannot be obtained, which makes it difficult to decide the exposure.

Therefore, if the intensity $I_{V.R}$ is low, the ratio of the electrical signal converted by the light-sensitive device accepting the light transmitted through the IR filter in the electrical signal used for deciding the exposure is increased. By thus processing, the electrical signal having the high intensity $I_{I.R}$ can be used for deciding the exposure, and accordingly the sensitivity can be enhanced.

On the other hand, if the intensity $I_{V.R}$ is high, the intensity $I_{I.R}$, which is higher than the intensity $I_{V.R}$, is saturated, and accordingly, if only the electrical signal converted by the light-sensitive device accepting the light transmitted through the IR filter is used for deciding the exposure, the decision of the exposure is made based on the saturated intensity $I_{I.R}$, thus the appropriate decision of the exposure is prevented.

Therefore, if the intensity $I_{V.R}$ is high, the ratio of the electrical signals converted by the light-sensitive devices accepting the light transmitted through the R, G, and B filters in the electrical signal used for deciding the exposure is increased. By thus processing, the electrical signal having the intensity $I_{V.R}$ lower than the intensity $I_{I.R}$ can be used for deciding the exposure, and accordingly the appropriate decision of the exposure becomes possible.

It is not necessarily required however that, as described above, the ratio between the electrical signals converted by the light-sensitive devices accepting the light transmitted through the R, G, and B filters and the electrical signal converted by the light-sensitive device accepting the light transmitted through the IR filter in the electrical signal used for deciding the exposure is varied in accordance with the value of the intensity $I_{V.R}$.

For example, it is possible that only the electrical signal converted by the light-sensitive device accepting the light transmitted through the IR filter is used for deciding the exposure if the intensity $I_{V.R}$ of the electrical signals converted by the light-sensitive devices accepting the light transmitted through the R, G, and B filters is lower than a predetermined intensity value, and only the electrical signals converted by the light-sensitive devices accepting the light transmitted through the R, G, and B filters are used for deciding the exposure if the intensity $I_{V.R}$ of the electrical signals converted by the light-sensitive devices accepting the light transmitted through the R, G, and B filters is higher than a predetermined intensity value.

To achieve the above, a point for switching between the case in which only the electrical signal converted by the light-sensitive device accepting the light transmitted through the IR filter is used for deciding the exposure and the case in which only the electrical signals converted by the light-sensitive devices accepting the light transmitted through the R, G, and B filters are used for deciding the exposure is provided. Specifically, as shown in FIG. 3, it is arranged that a threshold intensity $I_0$ of the predetermined value with respect to the intensity $I_{V.R}$ of the electrical signals converted by the light-sensitive devices accepting the light transmitted through the R, G, and B filters becomes the point described above.

If the value of the intensity $I_{V.R}$ is smaller than the threshold intensity $I_0$, only the electrical signal relating to the intensity $I_{I.R}$ and converted by the light-sensitive device accepting the light transmitted through the IR filter is used for deciding the exposure. In this case, since the subject illuminance E is smaller than $P_1$, the electrical signal relating to the intensity $I_{I.R}$ with high sensitivity can be used for deciding the exposure, thus the appropriate decision of the exposure can be made.

If the value of the intensity $I_{V.R}$ is greater than the threshold intensity $I_0$, only the electrical signals relating to the intensity $I_{V.R}$ and converted by the light-sensitive devices accepting the light transmitted through the R, G, and B filters are used for deciding the exposure. In this case, since the subject illuminance E is smaller than $P_1$, the electrical signal relating to the intensity $I_{I.R}$, which has unnecessarily high sensitivity, and might be saturated, is not used for deciding the exposure, thus the appropriate decision of the exposure can be made.

Figure 4:
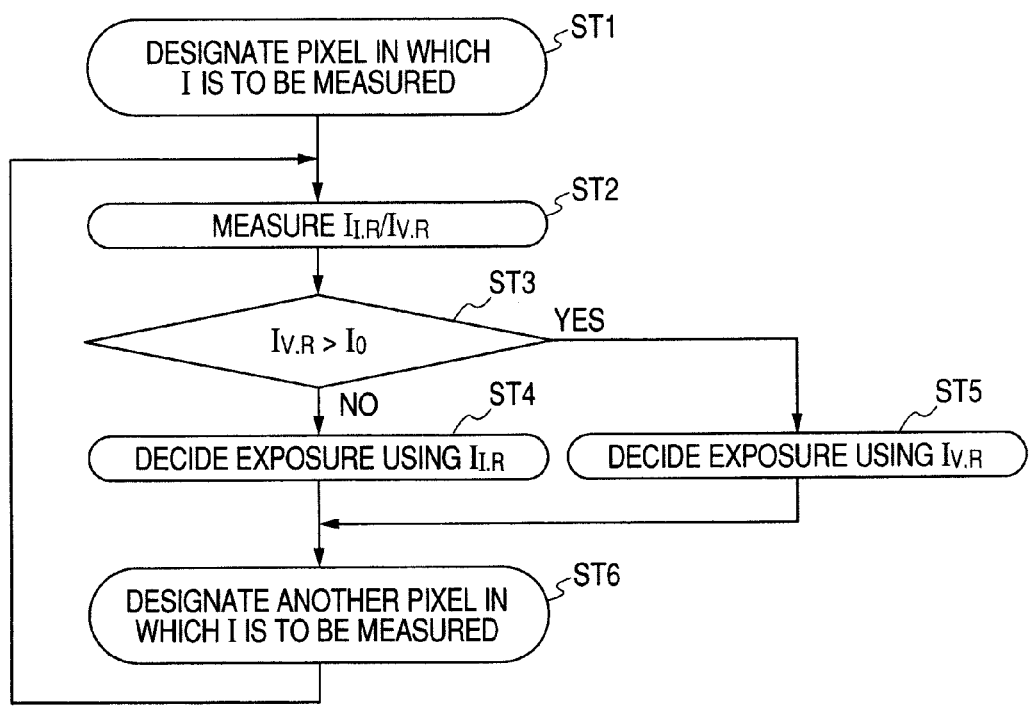
FIG. 4 is a flowchart showing the flow of deciding the exposure in the imaging apparatus according to the embodiment of the invention.

The exposure deciding process in the image processing section 7 described above will be explained with reference to the flowchart shown in FIG. 4. Firstly, as shown in the step ST1, the pixel in which the intensity of the electrical signals converted by the light-sensitive devices accepting the light from the subject is to be measured is designated.

Subsequently, as shown in the step ST2, the intensity $I_{I.R}$ of the infrared light component and the intensity $I_{V.R}$ of the visible light component in the electrical signals converted by the light-sensitive devices in the designated pixel are measured. It should be noted that in this case, it is possible that only the intensity $I_{V.R}$ of the electrical signals relating to the visible light component is measured.

Then, as shown in the step ST3, whether or not the intensity $I_{V.R}$ measured in the step ST2 exceeds the threshold intensity $I_0$ is judged. If the intensity $I_{V.R}$ does not exceed the threshold intensity $I_0$, as shown in the step ST4, the exposure is decided using only the electrical signal relating to the intensity $I_{I.R}$. If the intensity $I_{V.R}$ exceeds the threshold intensity $I_0$, as shown in the step ST5, the exposure is decided using only the electrical signals relating to the intensity $I_{V.R}$.

After the actual exposure process or other processes following the exposure deciding process for the pixel designated in the step ST1 are completed, as shown in the step ST6, another pixel than the pixel designated in the step ST1, in which the intensity of the electrical signals converted by the light-sensitive devices accepting the light from the subject is to be measured is newly designated.

The light-sensitive devices have very high sensitivity to the light in the infrared region, and accordingly, the difference in the intensity of the electrical signal converted by the light-sensitive device provided with the IR filter is remarkable. Therefore, in the case in which the solid-state imaging device 3 receives the incident light from the subject 9 as shown in FIG. 6, the intensity of the electrical signal converted by the light-sensitive device with the IR filter becomes too low in the "pond" portion of the subject and too high in the "tree" portion of the subject.

Accordingly, in the imaging apparatus 1 according to the embodiment of the invention, it is arranged that the electrical signals converted by the light-sensitive devices included only in a predetermined area out of a number of light-sensitive devices are used for deciding the exposure. For example, in the case of shooting the subject 9 shown in FIG. 6, it is arranged that the electrical signals converted by the light-sensitive devices corresponding to the area of the "pond" portion in which the intensity of the electrical signals converted by the light-sensitive devices provided with the IR filter is too low and the area of the "tree" portion in which the intensity of the electrical signals is too high are not used for deciding the exposure.

Therefore, by using only the electrical signals converted by the light-sensitive devices in other areas than the areas described above for deciding the exposure, the electrical signals converted by the light-sensitive devices in the areas in which the intensity of the electrical signals converted by the light-sensitive devices provided with the IR filters is too high or too low can be eliminated from the decision of the exposure.

Figure 6:
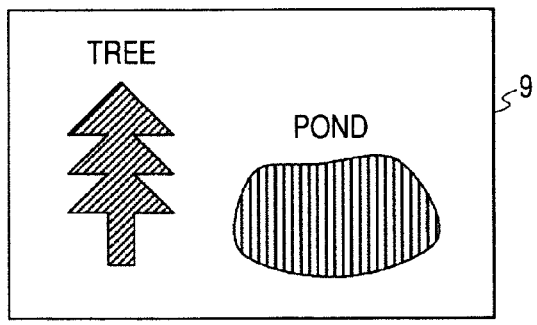
FIG. 6 is a diagram showing an example of the subject to be shot by the imaging apparatus according to the embodiment of the invention.
Figure 7:
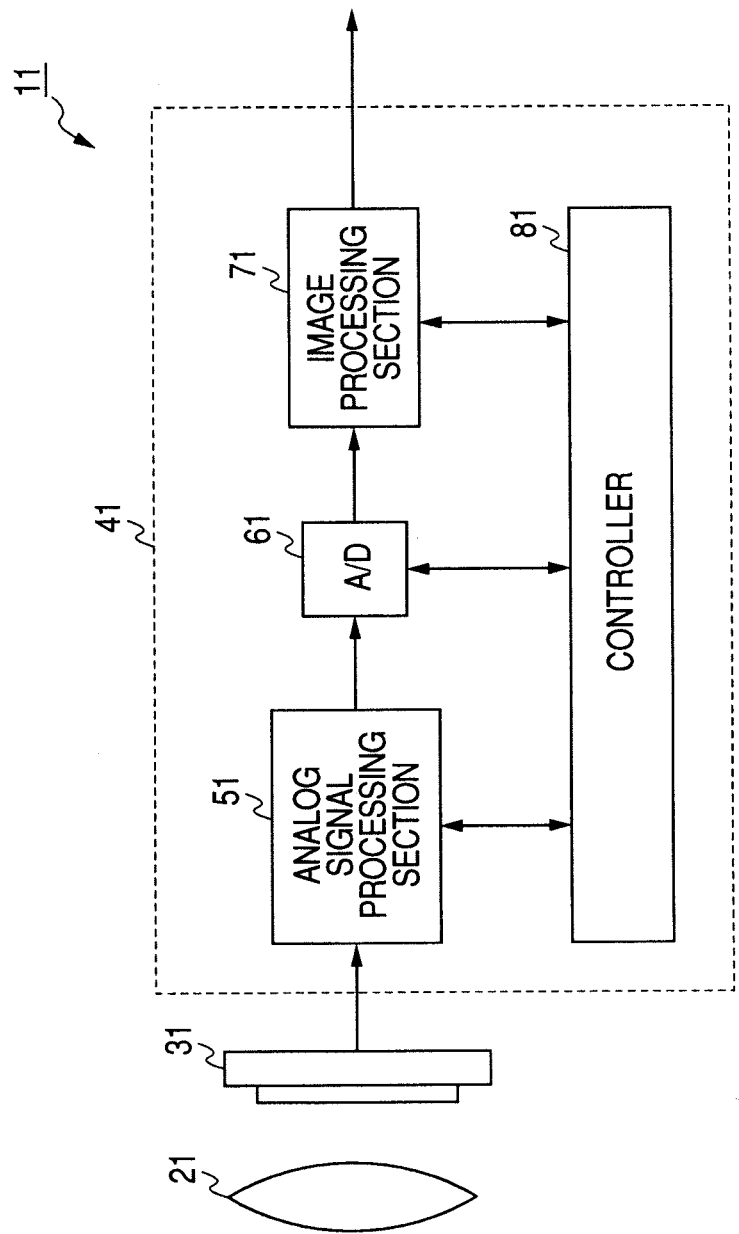
FIG. 7 is a diagram showing the configuration of an imaging apparatus according to the related art.
Figure 8A:
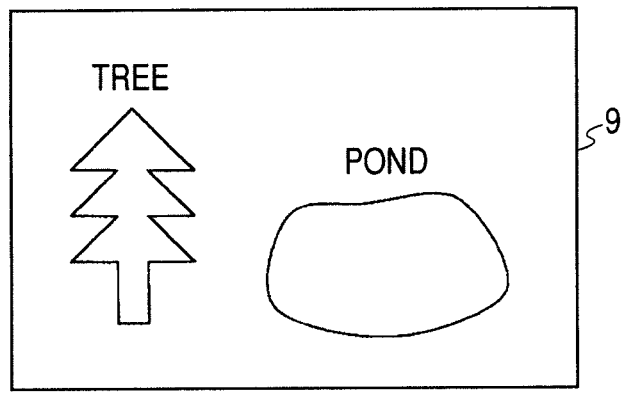
FIGS. 8A through 8C are diagrams showing an example of the subject to be shot by an imaging apparatus.
Figure 8B:
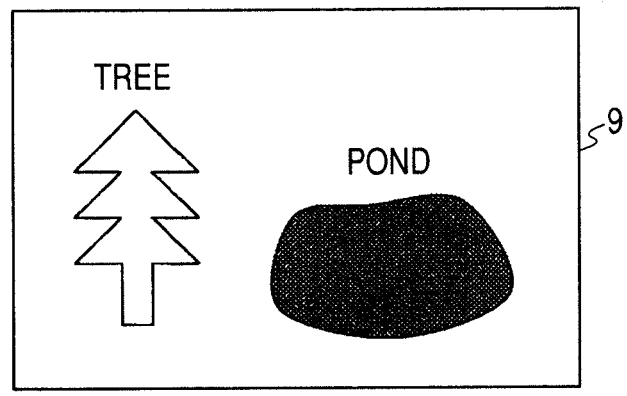
Figure 8C:
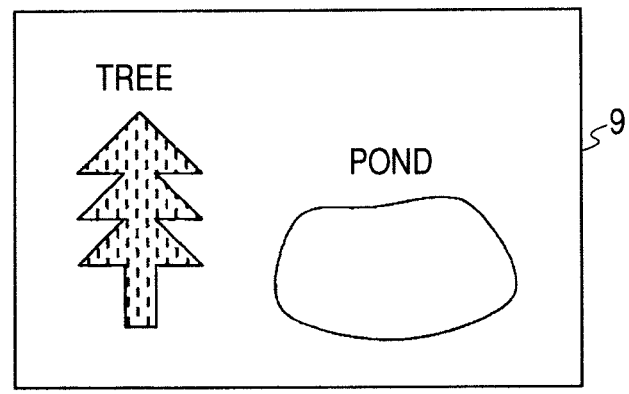
Figure 9:
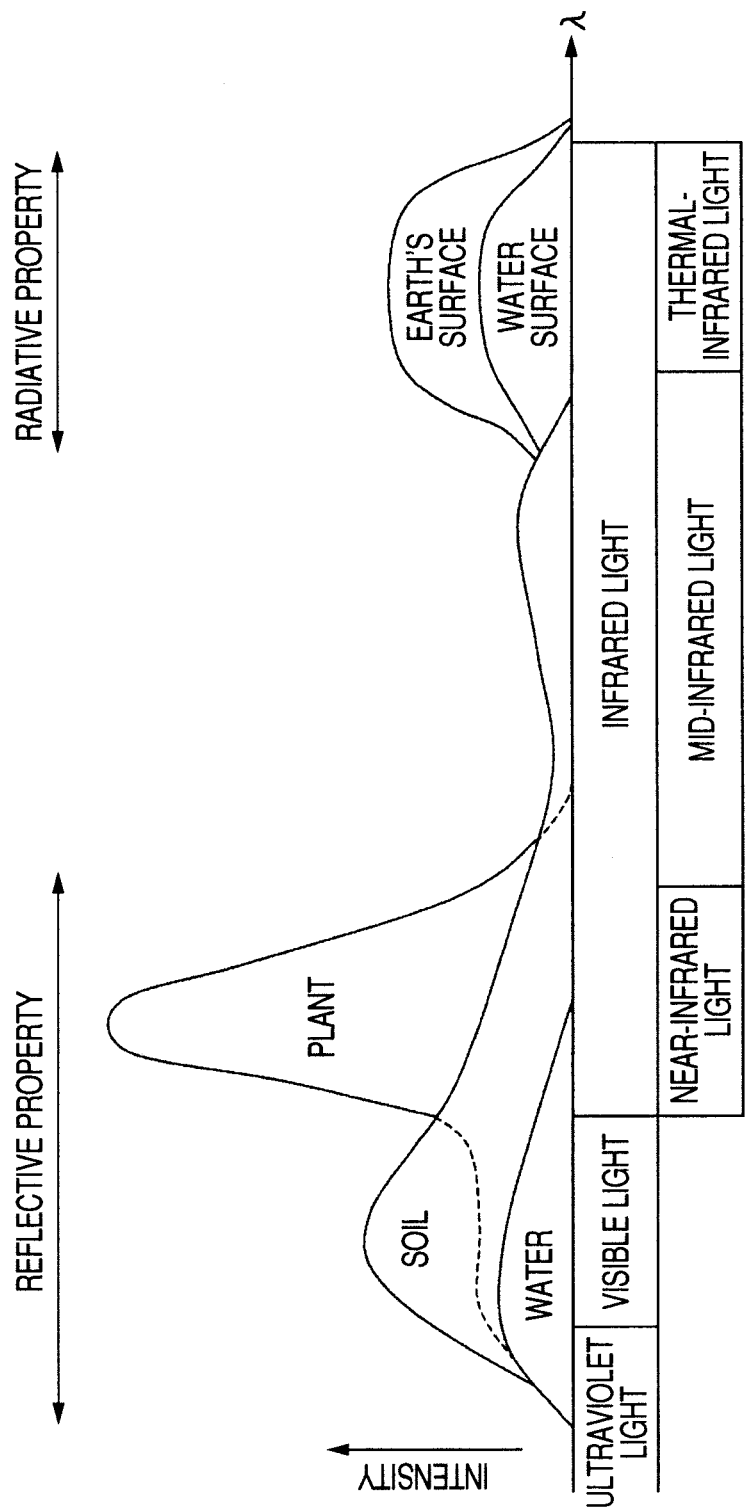
FIG. 9 is a chart showing the distribution of light reflection intensity of water, soil, and plants in wavelength.

By thus processing, it can be prevented that the shot image in which the "tree" portion and the "pond" portion of the subject 9 are black out or white out is caused in the case of shooting the subject 9 as shown in FIG. 6 with the imaging apparatus 1.

Figure 5:
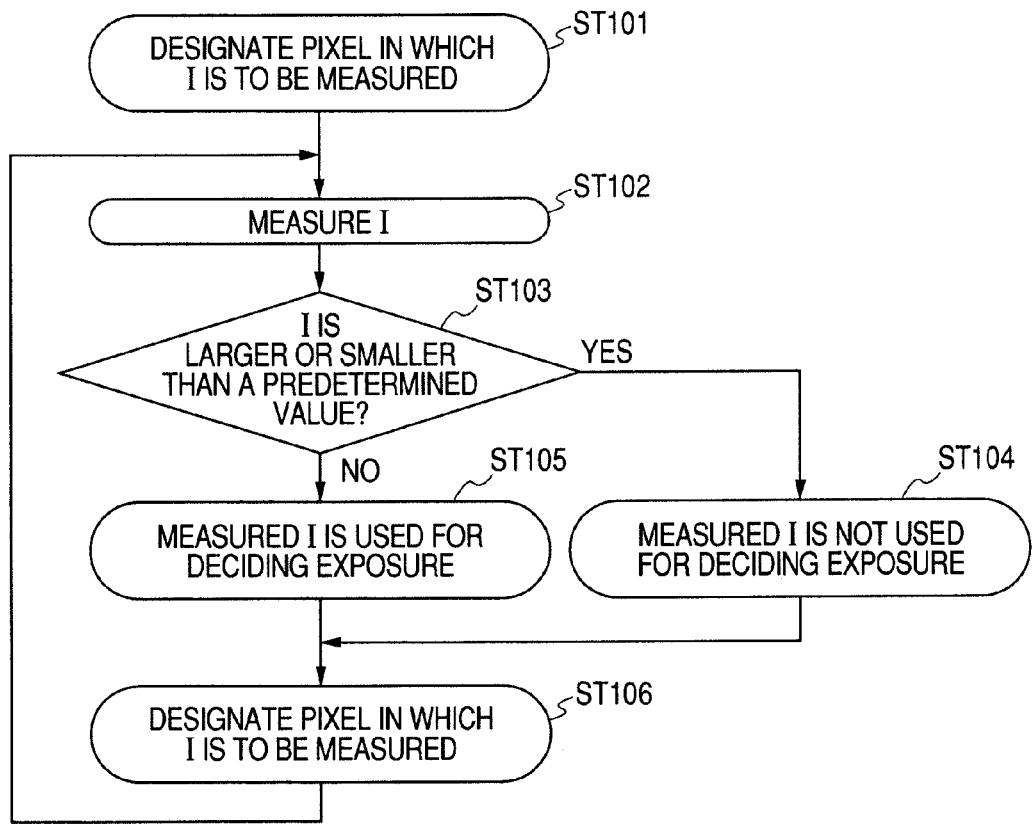
FIG. 5 is a flowchart showing the flow of deciding the exposure in the imaging apparatus according to the embodiment of the invention.

FIG. 5 shows a flow for preventing the electrical signals converted by the light-sensitive devices provided with the IR filters and included in a predetermined area out of a number of light-sensitive devices from being used for deciding the exposure.

Firstly, the pixel in which the intensity I of the electrical signals converted by the light-sensitive devices accepting the light from the subject is to be measured is designated as shown in the step ST101, and then the intensity I of the electrical signals in that pixel is measured as shown in the step ST102. Subsequently, as shown in the step ST103, whether or not the intensity I of the electrical signals converted by the light-sensitive devices provided with the IR filters in the present pixel is greater than a predetermined threshold value is judged.

If the intensity I of the electrical signals is higher or lower than the threshold value, the electrical signals are not used for deciding the exposure as shown in the step ST104. Or, if this is not the case, as shown in the step ST105, the electrical signals are used for deciding the exposure. After the flow of the step ST104 or ST105 has been completed, another pixel in which the intensity I of the electrical signals is to be measured is designated as shown in the step ST106, and then the process returns to the flow of the step ST102.

It should be noted that the threshold value can be set as desired in accordance with receiving sensitivity of the light-sensitive devices provided with the IR filters, and by setting the threshold value properly, it becomes possible to appropriately decide the exposure of the subject.

It should be understood by those skilled in the art that various modifications, combinations, sub-combinations and alterations may occur depending on design requirements and other factors insofar as they are within the scope of the appended claims or the equivalents thereof.

What is claimed is:

1. A method of generating digital image data using an electronic imaging apparatus comprising:
    generating electronic image signals via a plurality of light-sensitive devices each having sensitivity to light in a range from a visible region to an infrared region;
    wherein a plurality of first filters for transmitting light in the visible region are provided for members of a first group of the plurality of light-sensitive devices;
    wherein a plurality of second filters for transmitting light in the infrared region are provided for members of a second group of the plurality of light-sensitive devices; and
    automatically determining whether a signal output from a member of the first group or the second group is used in determining an exposure value via a processor controlled system based on a signal intensity determination and further wherein if a visible light range pixel signal intensity is greater than a threshold, only visible light pixel signals are used for exposure control and if a visible light range intensity is less than a certain value only infrared pixel signals are used for exposure control.

2. The method of generating digital image data according to claim 1, wherein the determination of whether an infrared light-sensitive device or a visible region light-sensitive device is to be used in determining the exposure value is performed in a plurality of different regions and if the selected signal has an intensity exceeding a predetermined threshold, the signal is ignored.

3. A method of manufacturing an electronic imaging apparatus comprising:
    forming a solid-state imaging device provided with a plurality of light-sensitive devices each having sensitivity to light in a range from a visible region to an infrared region;
    forming a plurality of first filters for transmitting light in the visible region to corresponding members of a first group of light-sensitive devices;
    forming a plurality of second filters for transmitting light in the infrared region to corresponding members of a second group of light-sensitive devices; and
    providing a signal processing section controlled via an electronic processor that receives electric signals converted by the light-sensitive devices and determines whether a signal output from a member of the first group or the second group is used in determining an exposure value based on a signal intensity determination and further wherein if a visible light range pixel signal intensity is greater than a threshold, only visible light pixel signals are used for exposure control and if a visible light range intensity is less than a certain value only infrared pixel signals are used for exposure control.

4. The method of manufacturing an imaging apparatus according to claim 3, wherein the signal processing section determines whether an infrared light-sensitive device or a visible region light-sensitive device is to be used by analyzing in a plurality of different regions and if the selected signal has an intensity exceeding a predetermined threshold, the signal is ignored.

* * * * *